US012620504B2

(12) United States Patent
Critchley

(10) Patent No.: US 12,620,504 B2
(45) Date of Patent: May 5, 2026

(54) IRRADIATION VIAL WITH BREAKAWAY CAP

(71) Applicant: SHINE Technologies, LLC, Janesville, WI (US)

(72) Inventor: Matt Critchley, Brooklyn, WI (US)

(73) Assignee: SHINE Technologies, LLC, Janesville, WI (US)

( * ) Notice: Subject to any disclaimer, the term of this patent is extended or adjusted under 35 U.S.C. 154(b) by 418 days.

(21) Appl. No.: 18/202,138

(22) Filed: May 25, 2023

(65) Prior Publication Data

US 2024/0395430 A1 Nov. 28, 2024

(51) Int. Cl.
*G21G 1/02* (2006.01)
*G21F 5/015* (2006.01)

(52) U.S. Cl.
CPC ............... *G21F 5/015* (2013.01); *G21G 1/02* (2013.01)

(58) Field of Classification Search
CPC .................................. G21F 5/015; G21G 1/02
See application file for complete search history.

(56) References Cited

U.S. PATENT DOCUMENTS

| | | | |
|---|---|---|---|
| 4,924,584 A | 5/1990 | Harney et al. | |
| 5,085,332 A | 2/1992 | Gettig et al. | |
| 8,542,789 B2 | 9/2013 | Russell, II et al. | |
| 8,842,798 B2 | 9/2014 | Russell et al. | |
| 9,196,390 B2 | 11/2015 | Bloomquist et al. | |
| 9,589,691 B2 | 3/2017 | Allen et al. | |
| 10,820,403 B2 | 10/2020 | Schuster | |
| 2007/0032775 A1 | 2/2007 | Niedospial, Jr. et al. | |
| 2012/0048827 A1 | 3/2012 | Levin | |
| 2019/0321262 A1 | 10/2019 | Chudek et al. | |
| 2023/0338747 A1* | 10/2023 | Marsteller ............... | A61M 1/84 |

OTHER PUBLICATIONS

International Search Report & Written Opinion for PCT/US2024/030750, mailed Nov. 21, 2024, 18 pages.

Dash et al., Production of 177Lu for Targeted Radionuclide Therapy: Available Options, Nucl. Med. Mol. Imaging (2015) 49:85-107, Korean Society of Nuclear Medicine.

* cited by examiner

*Primary Examiner* — Nicole M Ippolito

(74) *Attorney, Agent, or Firm* — Casimir Jones, S.C.; Brian F. Bradley

(57) ABSTRACT

A vial for an irradiation target. The vial comprises a body including a cylindrical wall extending along a longitudinal axis, a bottom wall portion at a first end of the body, and an opening at a second end of the body that is opposite the first end. The vial further comprises a cap coupled to the body at the second end, the cap includes an exterior frangible portion and an interior frangible portion.

19 Claims, 6 Drawing Sheets

IRRADIATION VIAL WITH BREAKAWAY CAP

TECHNOLOGY

The present disclosure is generally related to irradiation vials. More particularly, the present disclosure is directed to vials for an irradiation target (e.g., ytterbium) for use within a hot cell.

BACKGROUND

Ytterbium-176 (Yb-176), when irradiated, generates Lutetium-177 (Lu-177). Lu-177 is a radioisotope that is used in the treatment of neuro endocrine tumors, prostate, breast, renal, pancreatic, and other cancers. In the coming years, approximately 70,000 patients per year will need Lu-177 during their medical treatments.

Once an irradiation vial (containing Yb-176, for example) has been irradiated, the irradiation vial can only be handled by manipulators within a hot cell (e.g., an appropriately radiation-shielded enclosure). This makes it difficult to manipulate and open the irradiation vial. Accordingly, a need exists for improved irradiation vials.

SUMMARY

According to a first aspect of the present disclosure, a vial for an irradiation target, the vial comprising: a body including a cylindrical wall extending along a longitudinal axis, a bottom wall portion at a first end of the body, and an opening at a second end of the body that is opposite the first end; and a cap coupled to the body at the second end, the cap includes an exterior frangible portion and an interior frangible portion.

A second aspect includes the vial of the first aspect, wherein the cap includes a breakaway portion that intersects the longitudinal axis.

A third aspect includes the vial of the first aspect or the second aspect, wherein a burr formed in response to removing the breakaway portion from the cap is positioned radially outward from an inner cylindrical surface of the body.

A fourth aspect includes the vial of any of the previous aspects, wherein the vial is configured to receive an irradiation target within a cavity formed by the body and the cap.

A fifth aspect includes the vial of any of the previous aspects, wherein the exterior frangible portion is a circumferential groove.

A sixth aspect includes the vial of any of the previous aspects, wherein the circumferential groove extends 360 degrees.

A seventh aspect includes the vial of any of the previous aspects, wherein the interior frangible portion is a circumferential groove.

An eight aspect includes the vial of any of the previous aspects, wherein the circumferential groove extends 360 degrees.

A ninth aspect includes the vial of any of the previous aspects, wherein the exterior frangible portion and the interior frangible portion at least partially overlap along the longitudinal axis.

A tenth aspect includes the vial of any of the previous aspects, wherein the cap includes a neck portion, a breakaway portion, and a main portion positioned between the neck portion and the breakaway portion.

An eleventh aspect includes the vial of any of the previous aspects, wherein the exterior frangible portion and interior frangible portion are positioned between the main portion and the breakaway portion.

A twelfth aspect includes the vial of any of the previous aspects, wherein the cap includes an inner cylindrical cap surface that defines a cap cavity diameter, and wherein the inner cylindrical cap surface extends through the main portion and the neck portion.

A thirteenth aspect includes the vial of any of the previous aspects, wherein the body includes a circumferential groove that at least partially receives the neck portion of the cap.

A fourteenth aspect includes the vial of any of the previous aspects, wherein the cap includes a plurality of circumferential ribs formed on the neck portion.

A fifteenth aspect includes the vial of any of the previous aspects, wherein the cylindrical wall of the body includes an inner cylindrical surface that defines a cavity diameter, and wherein the cap includes an inner cylindrical cap surface that defines a cap cavity diameter, wherein the cap cavity diameter is equal to the cavity diameter.

A sixteenth aspect includes the vial of any of the previous aspects, wherein a cavity is at least partially defined by the inner cylindrical surface of the body and the inner cylindrical cap surface of the cap.

A seventeenth aspect includes the vial of any of the previous aspects, wherein the cap includes an end surface, wherein the interior frangible portion is positioned between the end surface and the inner cylindrical cap surface.

A eighteenth aspect includes the vial of any of the previous aspects, wherein the cylindrical wall of the body includes an outer cylindrical surface that defines a body diameter, and wherein the cap include an outer cylindrical cap surface that defines a cap diameter, wherein the cap diameter is equal to the body diameter.

An nineteenth aspect includes the vial of any of the previous aspects, wherein the cap includes a hex surface, and wherein the exterior frangible portion is positioned between the hex surface and the outer cylindrical cap surface.

A twentieth aspect includes the vial of any of the previous aspects, wherein a portion of the cap is removed in response to applying a torque about the longitudinal axis to the portion of the cap above a threshold torque.

A twenty-first aspect includes the vial of any of the previous aspects, wherein the body comprises a material that is chemically non-reactive with ytterbium.

According to a twenty-second aspect of the present disclosure, method comprising: positioning a target inside a cavity of a body; positioning a cap at an open end of the body; securing the cap to the body to create a sealed vial; irradiating the target in the sealed vial to generate an irradiated target; removing a portion of the cap from the sealed vial to create an opened vial with an debris formed where the portion was removed; and removing the irradiated target from the opened vial without the irradiated target contacting the debris.

A twenty-third aspect includes the method of the twenty-second aspect, wherein the target comprises one or more ytterbium isotopes and the irradiated target comprises a combination of one or more ytterbium isotopes and one or more lutetium isotopes.

A twenty-fourth aspect includes the method of the twenty-second or twenty-third aspect, wherein positioning the cap includes positioning at least a portion of the cap within the open end of the body.

A twenty-fifth aspect includes the method of any of the previous aspects, wherein securing the cap to the body includes welding the cap to the body.

A twenty-sixth aspect includes the method of any of the previous aspects, wherein removing the portion of the cap is performed within a hot cell and includes applying a torque to the cap above a threshold torque to shear, break, or fracture the portion from the cap.

A twenty-seventh aspect includes the method of any of the previous aspects, wherein removing the portion of the cap includes grasping the portion of the cap with a hot cell manipulator.

A twenty-eight aspect includes the method of any of the previous aspects, wherein removing the portion of the cap is performed within a hot cell.

A twenty-ninth aspect includes the method of any of the previous aspects, wherein the debris is a burr that is positioned radially outward from the cavity of the body.

These and additional features provided by the embodiments described herein will be more fully understood in view of the following detailed description, in conjunction with the drawings.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Referring generally to the figures, embodiments of the present disclosure are directed to vials that contain a target (such as one or more ytterbium isotopes) to be irradiated by, for example, a nuclear reactor. In some embodiments, the vial is positioned in a controlled helium (He) environment for irradiation by a high flux neutron source, such as a nuclear reactor. The irradiated target (e.g., a combination of one or more ytterbium isotopes and one or more lutetium isotopes) is then removed from the vial and further processed, for example, by a phase change system. Such a phase change system is disclosed in PCT Application No. PCT/US2021/025439, filed Apr. 1, 2021, and PCT Application No. PCT/US2020/061332, filed Nov. 19, 2020, each of which is incorporated herein by reference in its entirety.

Figure 1:
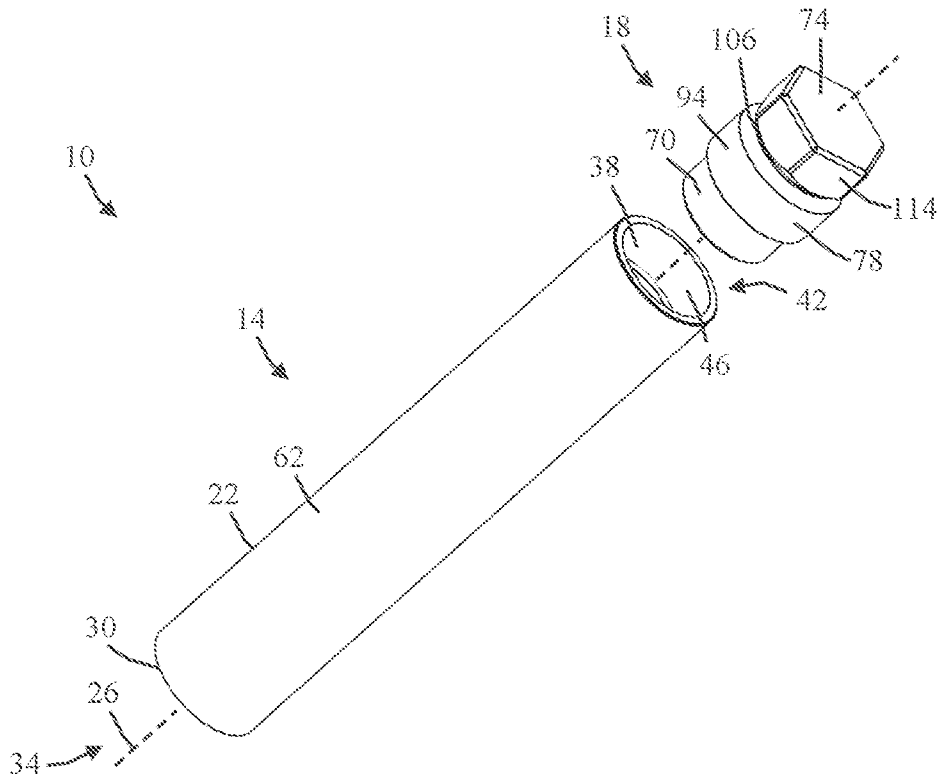
FIG. 1 is a perspective view of an irradiation vial in an unassembled configuration, configured to receive an irradiation target, according to one or more embodiments shown and described herein.

With reference to FIG. 1, an irradiation vial 10 includes a body 14 and a cap 18. In some embodiments, the irradiation vial 10 is a metallic (e.g., titanium) vial that can contain pellets of isotopically pure metallic Yb-176. In some embodiments, the body 14 comprises a material that is chemically non-reactive with ytterbium. In some embodiments, the cap 18 comprises a material that is chemically non-reactive with ytterbium. In some embodiments, the body 14 and the cap 18 are made of titanium. In other words, the vial 10 does not introduce impurities into the target (e.g., Yb-176 metal). In one embodiment, the irradiation vial 10 contains Yb-176 metal having a mass in a range of from 1 gram (g) to 15 g, such as from 2 g to 10 g, from 3 g to 8 g, or the like, which may be irradiated, for example, in a nuclear reactor, a fusion system, such as deuterium/tritium (D/T) fusion system, or the like. As such, the vial 10 does not contain elements that, upon exposure to high levels of radiation, are irradiated to dangerously high levels with an unreasonably long half-lives such that the irradiation vial cannot be safely handled.

In an initial unassembled configuration (FIG. 1), the body 14 and the cap 18 are separated to facilitate loading the target. The body 14 includes a cylindrical wall 22 extending along a longitudinal axis 26. A bottom wall portion 30 of the body 14 is positioned at a first end 34 of the body 14 and is coupled to the cylindrical wall 22. An opening 38 (FIG. 1) of the body 14 is positioned at a second end 42 of the body 14, opposite the first end 34. In other words, the body 14 includes a closed end (e.g., the first end 34) and an opposite open end (e.g., the second end 42). In the illustrated embodiment, the longitudinal axis 26 extends through the bottom wall portion 30 and extends through the opening 38.

Figure 2:
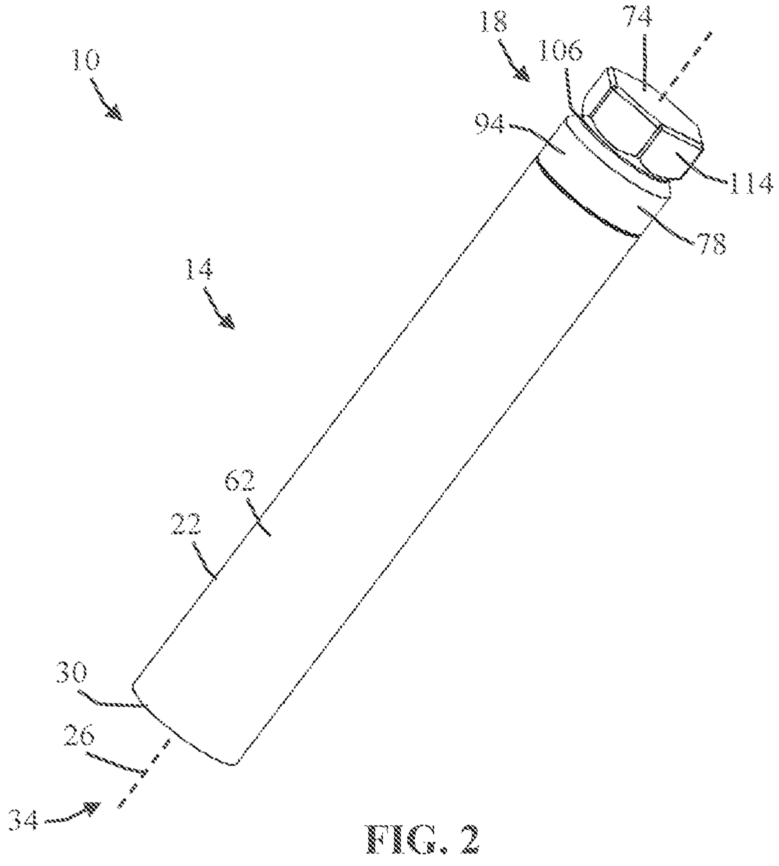
FIG. 2 is a perspective view of the irradiation vial of FIG. 1 in a closed configuration, configured to be irradiated, according to one or more embodiments shown and described herein.
Figure 3:
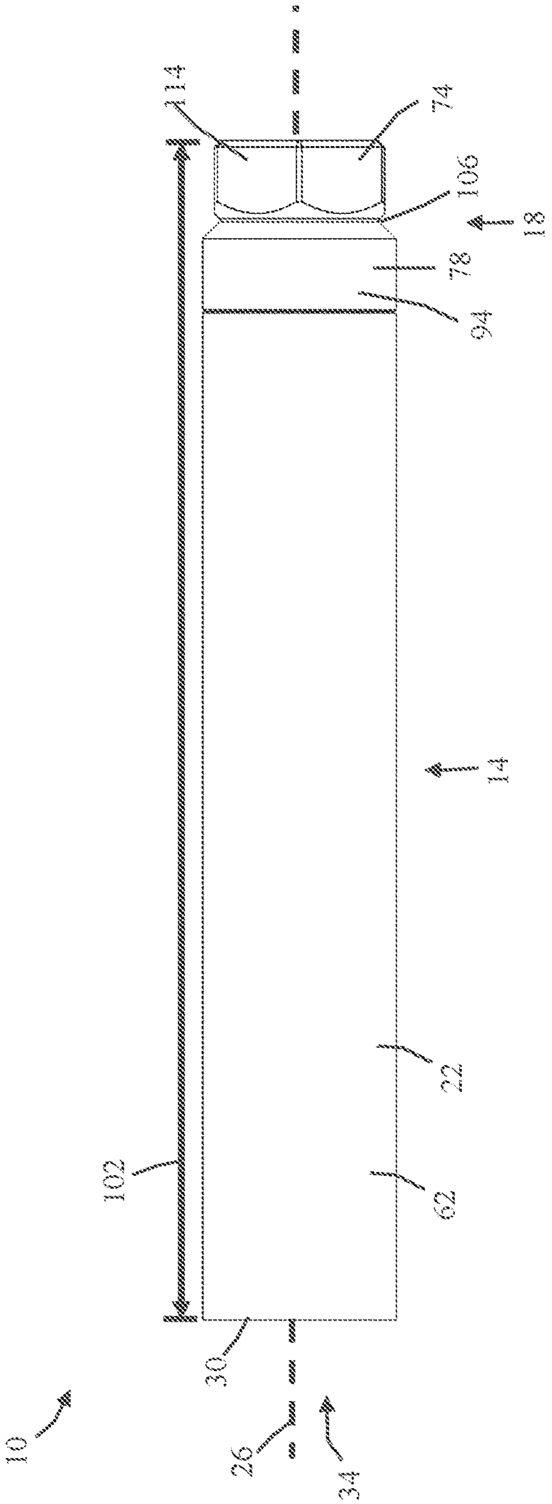
FIG. 3 is a side view of the irradiation vial of FIG. 2, according to one or more embodiments shown and described herein.

With reference to FIGS. 2 and 3, the vial 10 is shown in an assembled closed configuration, with the cap 18 is coupled to the body 14 at the second end 42 of the body 14. In the illustrated embodiment, the body 14 includes a circumferential groove 46 that at least partially receives the cap 18. As detailed further herein, the cap 18 is secured to the body 14 after the body 14 is loaded with an irradiation target. In other words, the vial 10 is configured to receive an irradiation target within a cavity 50 (FIG. 4) formed by the body 14 and the cap 18. In some embodiments, the cap 18 is welded to the body 14. In some embodiments, the cap 18 is secured to the body 14 with an adhesive or other suitable means. Advantageously, the irradiation vial 10 is sealed against leak and loss of the He environment within the irradiation vial. In addition, when the vial is immersed in water, no bubbles form on the surface of the irradiation vial 10. In some embodiments, the cap 18 and the body 14 form an interference fit.

Figure 4:
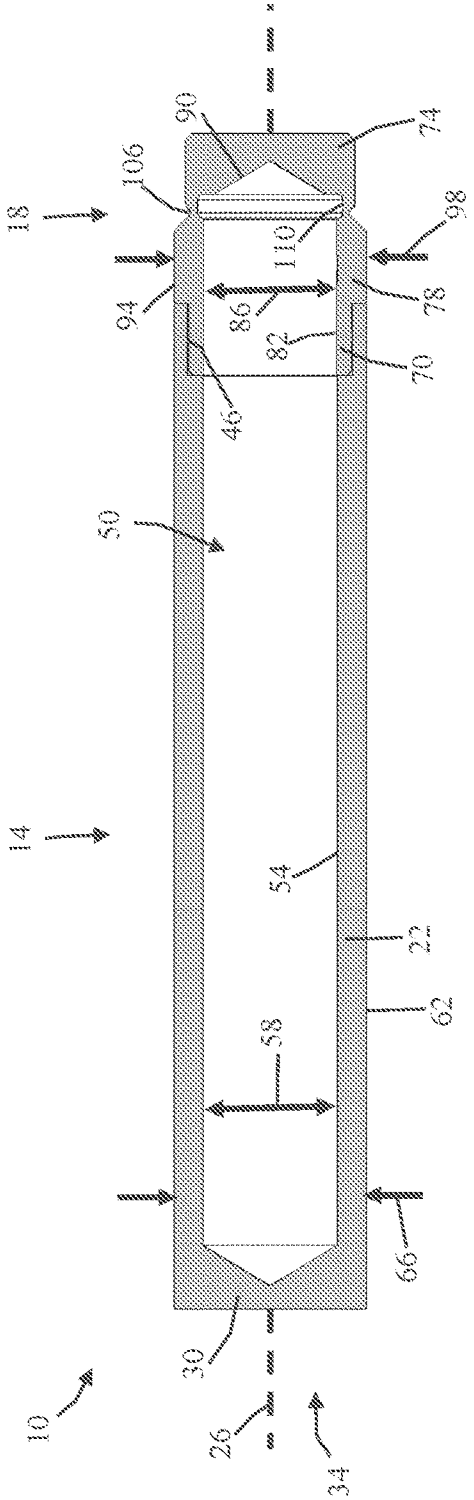
FIG. 4 is a cross-sectional view of the irradiation vial of FIG. 2, according to one or more embodiments shown and described herein.

With reference to FIG. 4, in the illustrated embodiment, the cylindrical wall 22 includes an inner cylindrical surface 54 that defines a cavity diameter 58. In the illustrated embodiment, the cylindrical wall 22 also includes an outer cylindrical surface 62 that defines a body diameter 66. The body diameter 66 is larger than the cavity diameter 58.

With reference to FIGS. 1 and 4, the cap 18 includes a neck portion 70, a breakaway portion 74, and a main portion 78 positioned between the neck portion 70 and the breakaway portion 74. The cap 18 further includes an inner cylindrical cap surface 82 that defines a cap cavity diameter 86. In the illustrated embodiment, the inner cylindrical cap surface 82 extends through the main portion 78 and the neck portion 70. The cap 18 further includes an interior end surface 90.

With reference to FIG. 4, in the assembled configuration, the neck portion 70 of the cap 18 is at least partially received in the circumferential groove 46 of the body 14. In the illustrated embodiment, the cap cavity diameter 86 is approximately equal to the cavity diameter 58. The cavity 50 is at least partially defined by the inner cylindrical surface 54 of the body 14 and the inner cylindrical cap surface 82 of the cap 18. As such, when the body 14 and cap 18 are assembled, the cavity 50 formed therebetween has a constant diameter (e.g., diameter 58, 86) along the longitudinal axis 26 between the bottom wall portion 30 and the main portion 78.

With continued reference to FIG. 4, the cap 18 includes an outer cylindrical cap surface 94 that defines a cap diameter 98. In the illustrated embodiment, the cap diameter 98 is approximately equal to the body diameter 66. As such, the vial 10 has a constant outer diameter along the longitudinal axis 26 from the bottom wall portion 30 to the main portion 78 of the cap 18. Advantageously, this shape (e.g., dimensional envelope) facilitates positioning of the vial 10 with respect to a nuclear reactor during the irradiation. In some embodiments, the vial has a maximum diameter (e.g., diameter 66, 86) having a value in a range of from 5 mm to 15 mm, such as from 6 mm to 10 mm, for example, 5 mm, 6 mm, 7 mm, 8 mm, 9 mm, 10 mm, 11 mm, 12 mm, 13 mm, 14 mm, 15 mm, or the like and a total length 102 (FIG. 3) having a value in a range of from 20 mm to 100 mm, such as from 25 mm to 75 mm, for example, 20 mm, 25 mm, 30 mm, 35 mm, 40 mm, 45 mm, 50 mm, 55 mm, 60 mm, 65 mm, 70 mm, 75 mm, 80 mm, 85 mm, 90 mm, 95 mm, 100 mm, or the like.

Figure 5:
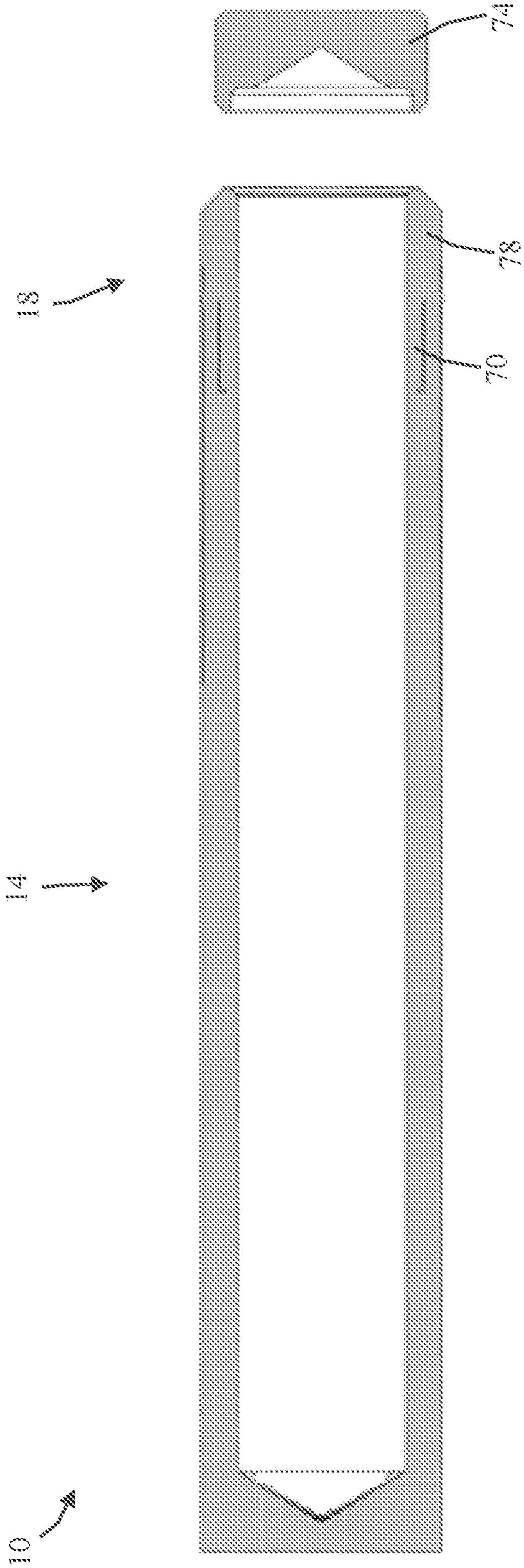
FIG. 5 is a cross-sectional view of the irradiation vial of FIG. 2 in an open configuration, configured to remove the irradiated target, according to one or more embodiments shown and described herein.

With reference to FIG. 5, the breakaway portion 74 is configured to be removed from the assembled vial after irradiation. Advantageously, the breakaway portion 74 is removable from the vial 10 using only robotic manipulators that are in a hot cell. In the illustrated embodiment, the breakaway portion 74 intersects the longitudinal axis 26.

Figure 6:
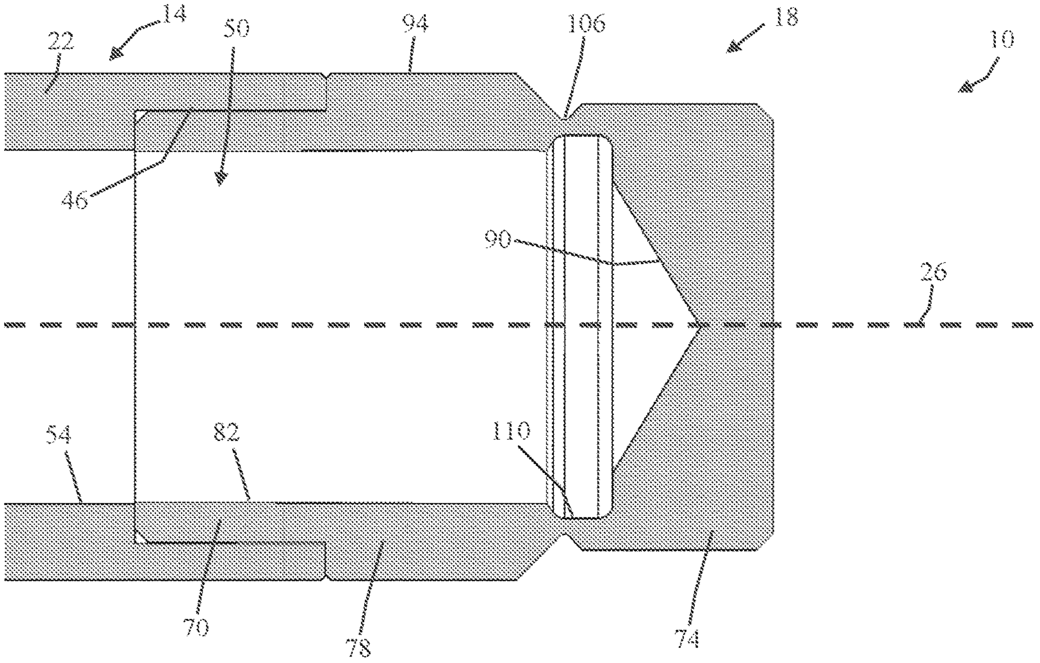
FIG. 6 is an enlarged partial view of the cross-sectional view of FIG. 4.
Figure 7:
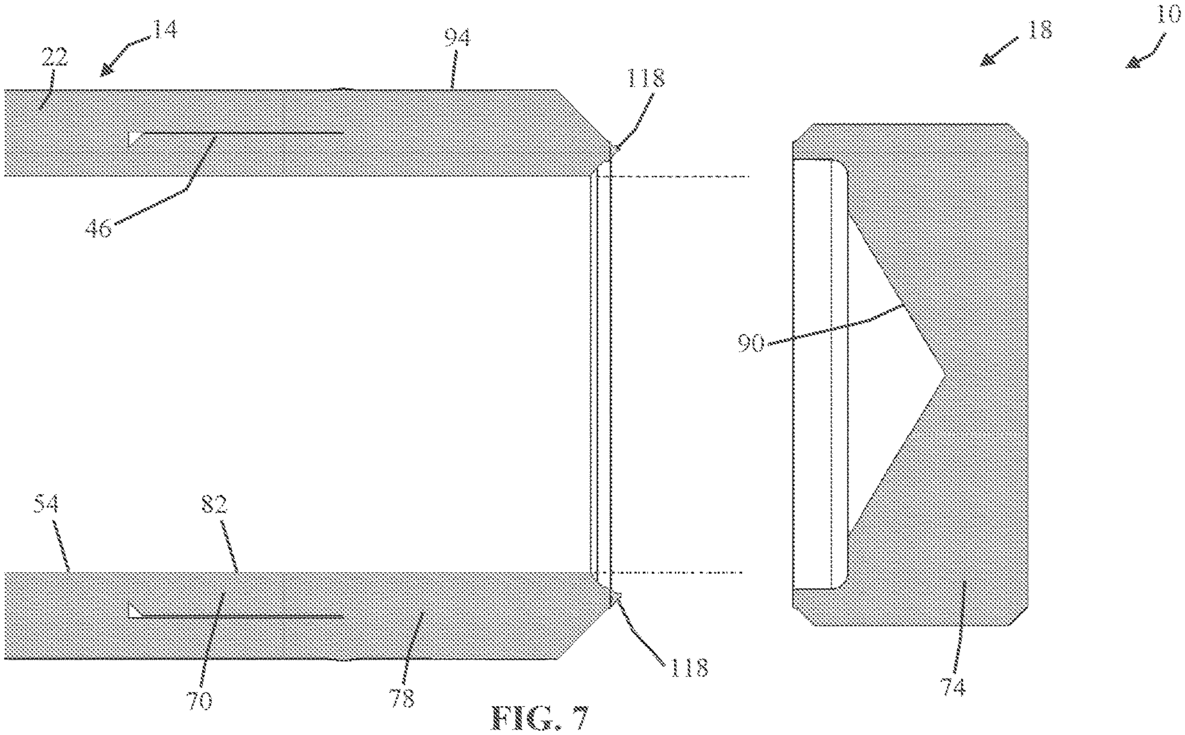
FIG. 7 is an enlarged partial view of the cross-sectional view of FIG. 5.

With reference to FIGS. 6 and 7, the cap 18 includes an exterior frangible portion 106 and an interior frangible portion 110. The exterior frangible portion 106 and the interior frangible portion 110 are positioned between the main portion 78 and the breakaway portion 74. In the illustrated embodiment, the interior frangible portion 110 is positioned between the end surface 90 and the inner cylindrical cap surface 82.

In some embodiments, the exterior frangible portion 106 is a circumferential groove. In the illustrated embodiment, the exterior frangible portion 106 is a circumferential groove that extends 360 degrees around the exterior of the cap 18. In some embodiments, the interior frangible portion 110 is a circumferential groove. In the illustrated embodiment, the interior frangible portion 110 is a circumferential groove that extends 360 degrees around the interior of the cap 18. With reference to FIG. 6, the exterior frangible portion 106 and the interior frangible portion 110 at least partially overlap along the longitudinal axis 26. In other words, the frangible portions 106, 110 at least partially overlap to create a weakened zone of reduced material thickness. As discussed further herein, the overlapping frangible portions 106, 110 advantageously locate where a burr is formed in response to removing the breakaway portion 74 of the cap 18.

With reference to FIGS. 1-3, the cap 18 includes an external hex surface 114. In the illustrated embodiment, the exterior frangible portion 106 is positioned between the hex surface 114 and the outer cylindrical cap surface 94. In the illustrated embodiment, the hex surface 114 is formed on the breakaway portion 74. Advantageously, the hex surface 114 includes a plurality of planar surfaces that are capable of being securely grasped by a hot cell manipulator. With a secure grasp of the hex surface, the operator can apply a torque the cap 18 with the hot cell manipulator. As such, the vial 10 is designed to overcome the difficulties that arise when handling the vial 10 is limited to hot cell manipulators. As detailed herein, when opening the vial 10 after irradiation, the vial 10 can only be handled by manipulators within a hot cell. The opening process, therefore, is limited to instruments that can be handled and operated by these manipulators.

With reference to FIG. 7, the breakaway portion 74 of the cap 18 is removed in response to applying a torque about the longitudinal axis 26 to the cap 18 that is above a threshold torque. In other words, torque above the threshold torque applied to the hex surface 114 results in the breakaway portion 74 shearing at the frangible portions 106, 110 and separated from the remaining portions of the cap 18 and body 14. A burr 118 is formed in response to removing the breakaway portion 74 from the cap 18. Advantageously, the material of the cap 18 shears at the external frangible portion 106 and the internal frangible portion 110. In the illustrated embodiment, the burr 118 that forms is positioned radially outward from the inner cylindrical surface 54 of the body 14 and radially outward from the inner cylindrical cap surface 82 of the cap 18. As such, the burr 118 does not interfere with or come into contact with the irradiated target when the irradiated target is removed from the vial 10. This advantageously avoids contact between the burr 118 and the irradiated target, which would otherwise result in contamination. In other words, both the exterior and interior frangible portions 106, 110 locate the snap and resulting burr in a predictable location. The burr is inevitable and is controlled in the vial 10 so the irradiated target can be removed. The inner frangible portion 110 moves the burr 118 radially outward from longitudinal axis 26 of the vial 10. The shape of the frangible portions 106, 110 are tuned so the burr 118 does not interfere with an opening of the irradiation vial.

As disclosed herein, the irradiation vial 10 has several advantages. The vial 10 safeguards the target (e.g., Yb-176 metal pellets) through the irradiation process. The vial 10 is designed and constructed to be compatible with a nuclear reactor in which the irradiation occurs. The vial 10 enables safe handling and practical insertion of the target (e.g., Yb-176 metal) into the irradiation vial. The vial 10 survives the irradiation process and survives post-irradiation transport and cooling until the Yb-176 is removed from the vial. The vial 10 permits a safe and pragmatic method of removing the irradiated target (e.g., irradiated Yb-176) from the vial 10.

Figure 8:
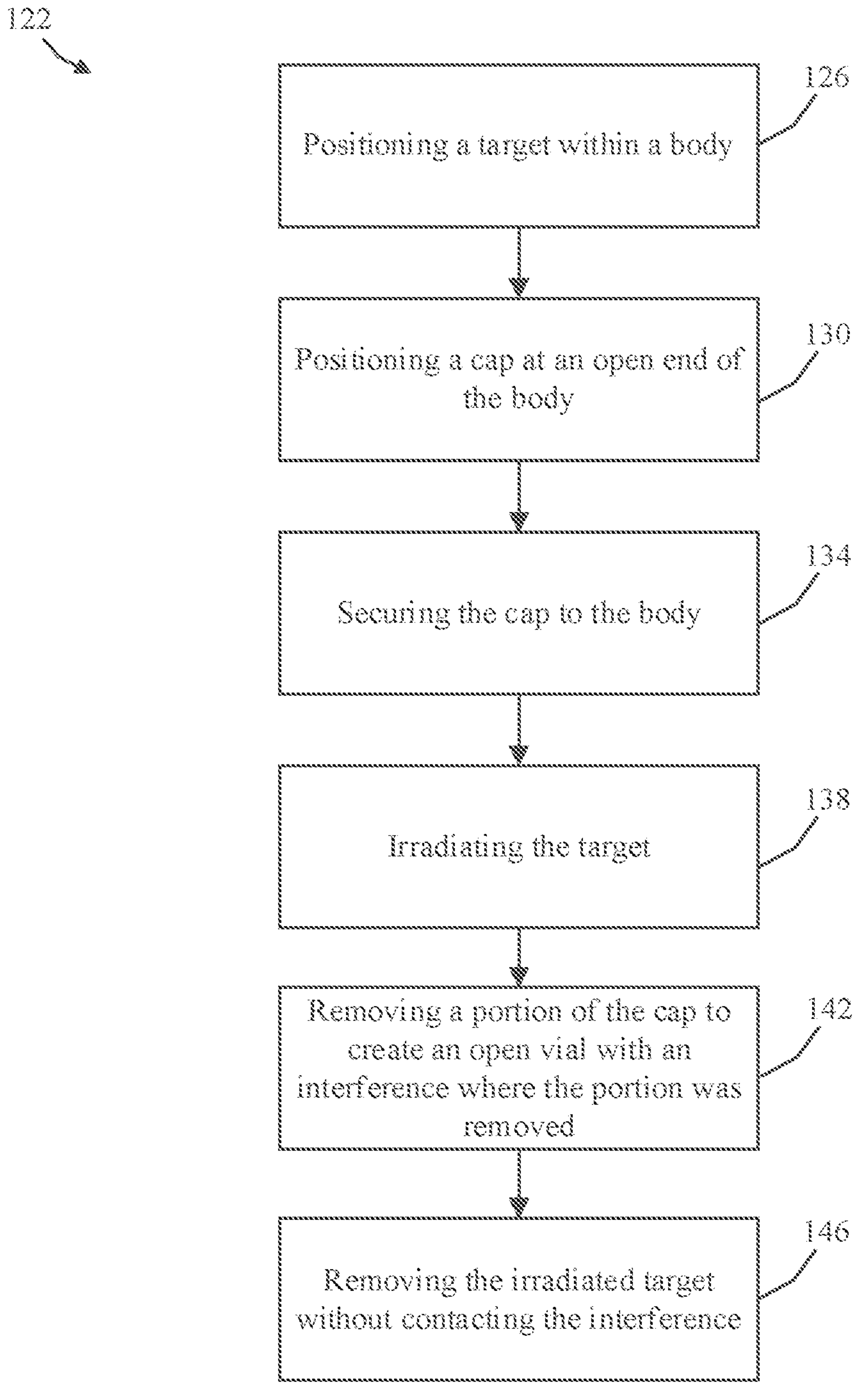
FIG. 8 is a flowchart of a method, according to one or more embodiments shown and described herein.

With reference to FIG. 8, a method 122 includes (STEP 126) positioning a target (e.g., one or more ytterbium isotopes) inside a cavity (e.g., cavity 50) of a body (e.g., body 14). The method 122 further includes (STEP 130) positioning a cap (e.g., cap 18) at an open end of the body, and (STEP 134) securing the cap to the body to create a sealed vial (e.g., FIG. 2). In some embodiments, positioning the cap includes positioning at least a portion of the cap within the open end of the body. In some embodiments, securing the cap to the body includes welding the cap to the body. In some embodiments, securing the cap to the body includes using an adhesive to couple the cap to the body.

With continued reference to FIG. 8, the method 122 further includes (STEP 138) irradiating the target in the sealed vial to generate an irradiated target (e.g., a combination of one or more ytterbium isotopes and one or more lutetium isotopes). The method 122 further includes (STEP 142) removing a portion (e.g., breakaway portion 74) of the cap from the sealed vial to create an opened vial with a debris (e.g., burr 118) formed where the portion was removed. In other words, the debris is formed in response to removing the portion of the cap from the sealed vial. In some embodiments, removing the portion of the cap is performed within a hot cell and includes applying a torque to the cap that is above a threshold torque to shear, break, or fraction the portion from the cap. In some embodiments, removing the portion of the cap includes grasping the portion of the cap to be removed with a hot cell manipulator. In some embodiments, removing the portion of the cap is performed within a hot cell.

The method 122 further includes (STEP 146) removing the irradiated target form the open vial without the irradiated target contacting the debris or burr. As discussed herein, the debris from breaking (e.g., burr) is advantageously positioned radially outward from the cavity of the body such that the debris does not contact the irradiated target as the irradiated target is removed from the cavity. In some embodiments, one or more of the method steps are performed within a hot cell that has limited tools available to manipulate the irradiation vial and target.

Moreover, in some embodiments, the vial 10 may be positioned in an inert or reduced pressure environment. For example, the vial 10 may be positioned in a chamber that forms an inert or reduced pressure environment. The inert or reduced pressure environment may be an environment with a pressure in a range of from 2000 torr to $1\times10^{-8}$, from 1520 torr to $1\times10^{-8}$ torr, from 1000 torr to $1\times10^{-8}$ torr, from 760 torr to $1\times10^{-8}$ torr, from 700 torr to $1\times10^{-8}$ torr, from 500 torr to $1\times10^{-8}$ torr, from 250 torr to $1\times10^{-7}$ torr, from 100 torr to $1\times10^{-6}$ torr, from 1 torr to $1\times10^{-6}$ torr, from $1\times10^{-1}$ torr to $1\times10^{-6}$ torr, $1\times10^{-3}$ or less, $1\times10^{-5}$ torr or less, $1\times10^{-6}$ torr or less, from 2000 torr to $1\times10^{-1}$ torr, from 1520 torr to 1 torr, from 1000 torr to 1 torr, from 760 torr to 1 torr, from 760 torr to 250 torr, any range having any two of these values as endpoints, or any value in a range having any two of these values as endpoints.

While the vial 10 is primarily described herein in relation to containing ytterbium, it should be understood that the irradiation vial may be used to irradiate of a variety of elements, for example any of the rare earth, and/or actinide metals where there is a difference in boiling/sublimation point, such as cerium (Ce), dysprosium (Dy), erbium (Er), europium (Eu), gadolinium (Gd), holmium (Ho), lanthanum (La), lutetium (Lu), neodymium (Nd), praseodymium (Pr), promethium (Pm), samarium (Sm), scandium (Sc), terbium (Tb), thulium (Tm), ytterbium (Yb), and yttrium (Y).

Figure 9:
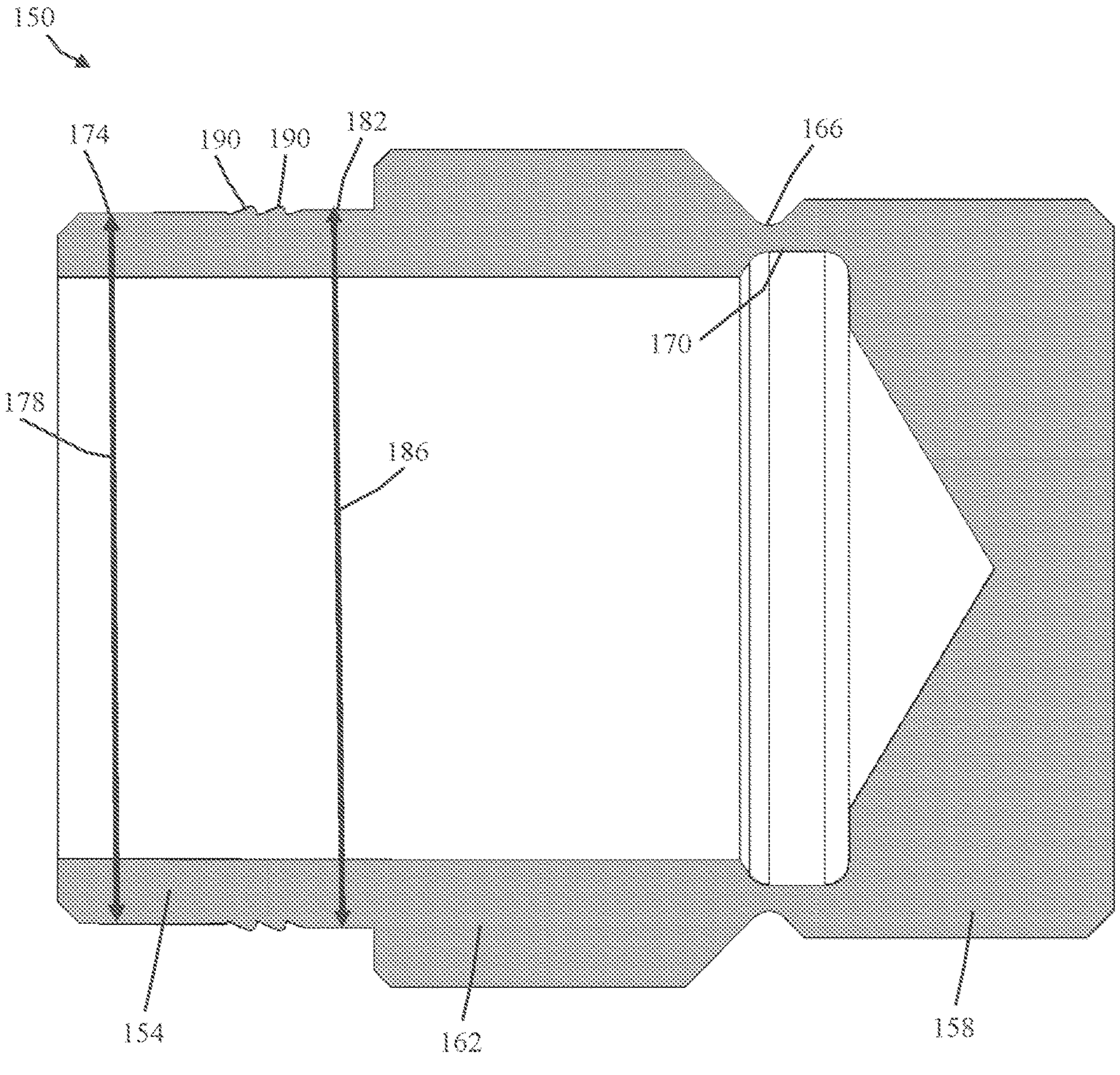
FIG. 9 is a cross-sectional view of a cap for an irradiation vial, according to one or more embodiments shown and described herein.

With reference to FIG. 9, a cap 150 similar to the cap 18 is illustrated. The cap 150 includes a neck portion 154, a breakaway portion 158, and a main portion 162 positioned between the neck portion 154 and the breakaway portion 158. The cap 150 further includes an exterior frangible portion 166 and an interior frangible portion 170. The neck portion 154 includes a first cylindrical section 174 with a first diameter 178 and a second cylindrical section 182 with a second diameter 186. In the illustrated embodiment, the second diameter 186 is larger than the first diameter 178.

The second cylindrical section 182 creates an interference fit when the cap 150 is assembled onto the body 14. In the assembled configuration, the neck portion 154 of the cap 150 is at least partially received in the circumferential groove 46 of the body 14. In the illustrated embodiment, the second cylindrical section 182 abuts the circumferential groove 46 of the body 14 and advantageously provides additional sealing and a final press-fit diameter lock.

With continued reference to FIG. 9, the cap 150 further includes a plurality of circumferential ribs 190 (e.g., raised lands) positioned between the first cylindrical section 174 and the second cylindrical section 182. The circumferential ribs 190 extend radially outward and abut the circumferential groove 46 of the body 14 when the cap 150 is assembled onto the body 14. In the assembled configuration, the circumferential ribs 190 imbed into the body 14 and create a tortuous path (e.g., a labyrinthine path) that inhibits leakage of gas contained within the assembled vial.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical values or idealized geometric forms provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, optical, or fluidic.

References herein to the positions of elements (e.g., "top," "bottom," "above," "below") are merely used to describe the orientation of various elements in the FIGURES. It should be noted that the orientation of various elements may differ according to other exemplary embodiments, and that such variations are intended to be encompassed by the present disclosure.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

While particular embodiments have been illustrated and described herein, it should be understood that various other changes and modifications may be made without departing from the spirit and scope of the claimed subject matter. Moreover, although various aspects of the claimed subject matter have been described herein, such aspects need not be utilized in combination. It is therefore intended that the appended claims cover all such changes and modifications that are within the scope of the claimed subject matter.

What is claimed is:

1. A vial for an irradiation target, the vial comprising:

a body including a cylindrical wall extending along a longitudinal axis, a bottom wall portion at a first end of the body, and an opening at a second end of the body that is opposite the first end; and a cap coupled to the body at the second end, the cap includes an exterior frangible portion and an interior frangible portion; and wherein the exterior frangible portion and the interior frangible portion at least partially overlap along the longitudinal axis.

2. The vial of claim 1, wherein the cap includes a breakaway portion that intersects the longitudinal axis.

3. The vial of claim 2, wherein a burr formed in response to removing the breakaway portion from the cap is positioned radially outward from an inner cylindrical surface of the body.

4. The vial of claim 1, wherein the vial is configured to receive an irradiation target within a cavity formed by the body and the cap.

5. The vial of claim 1, wherein the exterior frangible portion is a circumferential groove.

6. The vial of claim 1, wherein the interior frangible portion is a circumferential groove.

7. The vial of claim 1, wherein the cap includes a neck portion, a breakaway portion, and a main portion positioned between the neck portion and the breakaway portion.

8. The vial of claim 7, wherein the exterior frangible portion and interior frangible portion are positioned between the main portion and the breakaway portion.

9. The vial of claim 7, wherein the cap includes an inner cylindrical cap surface that defines a cap cavity diameter, and wherein the inner cylindrical cap surface extends through the main portion and the neck portion.

10. The vial of claim 7, wherein the body includes a circumferential groove that at least partially receives the neck portion of the cap.

11. The vial of claim 7, wherein the cap includes a plurality of circumferential ribs formed on the neck portion.

12. The vial of claim 1, wherein the cylindrical wall of the body includes an inner cylindrical surface that defines a cavity diameter, and wherein the cap includes an inner cylindrical cap surface that defines a cap cavity diameter, wherein the cap cavity diameter is equal to the cavity diameter.

13. The vial of claim 12, wherein a cavity is at least partially defined by the inner cylindrical surface of the body and the inner cylindrical cap surface of the cap.

14. The vial of claim 12, wherein the cap includes an end surface, wherein the interior frangible portion is positioned between the end surface and the inner cylindrical cap surface.

15. The vial of claim 1, wherein the cylindrical wall of the body includes an outer cylindrical surface that defines a body diameter, and wherein the cap include an outer cylindrical cap surface that defines a cap diameter, wherein the cap diameter is equal to the body diameter.

16. The vial of claim 1, wherein the exterior frangible portion is a circumferential groove; the interior frangible portion is a circumferential groove; wherein the cap includes a neck portion, a breakaway portion, and a main portion positioned between the neck portion and the breakaway portion; and wherein the exterior frangible portion and interior frangible portion are positioned between the main portion and the breakaway portion.

17. The vial of claim 16, wherein the breakaway portion intersects the longitudinal axis.

18. The vial of claim 17, wherein the cylindrical wall of the body includes an inner cylindrical surface that defines a cavity diameter, and wherein the cap includes an inner cylindrical cap surface that defines a cap cavity diameter, wherein the cap cavity diameter is equal to the cavity diameter; and wherein a cavity is at least partially defined by the inner cylindrical surface of the body and the inner cylindrical cap surface of the cap.

19. The vial of claim 18, wherein the cap includes an end surface, wherein the interior frangible portion is positioned between the end surface and the inner cylindrical cap surface.

* * * * *